(12) United States Patent
Chen et al.

(10) Patent No.: US 10,074,010 B2
(45) Date of Patent: Sep. 11, 2018

(54) IMAGE PROCESSING METHOD, DEVICE AND NON-TRANSITORY COMPUTER-READABLE MEDIUM

(71) Applicants: Chao Chen, Beijing (CN); Liyan Liu, Beijing (CN); Ying Zhao, Beijing (CN)

(72) Inventors: Chao Chen, Beijing (CN); Liyan Liu, Beijing (CN); Ying Zhao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 53 days.

(21) Appl. No.: 15/211,924

(22) Filed: Jul. 15, 2016

(65) Prior Publication Data

US 2017/0032183 A1 Feb. 2, 2017

(30) Foreign Application Priority Data

Jul. 30, 2015 (CN) .......................... 2015 1 0458583

(51) Int. Cl.
*G06K 9/00* (2006.01)
*G06K 9/48* (2006.01)

(52) U.S. Cl.
CPC ..... *G06K 9/00335* (2013.01); *G06K 9/00375* (2013.01); *G06K 9/48* (2013.01)

(58) Field of Classification Search
CPC ... G06K 9/00335; G06K 9/48; G06K 9/00375
USPC ....... 382/103, 190, 173, 181, 131, 128, 101, 382/107, 167; 345/1.1, 591, 633, 156, 345/157, 158; 348/126; 356/392; 358/402, 474, 518; 378/8, 901; 600/109, 600/117, 178; 716/119
See application file for complete search history.

(56) References Cited

U.S. PATENT DOCUMENTS

| | | | | |
|---|---|---|---|---|
| 6,144,366 A | * | 11/2000 | Numazaki | G06F 3/011 345/156 |
| 7,724,296 B2 | * | 5/2010 | Lonn | G06K 9/00248 348/207.99 |
| 8,864,655 B2 | * | 10/2014 | Ramamurthy | A61B 5/06 600/117 |
| 9,204,050 B2 | * | 12/2015 | Emura | G06F 3/0488 |
| 9,726,476 B2 | * | 8/2017 | Ramamurthy | G01B 11/16 |
| 2012/0093360 A1 | * | 4/2012 | Subramanian | G06K 9/00201 382/103 |
| 2014/0009418 A1 | | 1/2014 | Sugimoto | |
| 2015/0145762 A1 | | 5/2015 | Shimura | |

FOREIGN PATENT DOCUMENTS

JP 2013-250882 A 12/2013
JP 2014-016803 A 1/2014

OTHER PUBLICATIONS

Office Action dated Jul. 18, 2017 in Japanese Patent Application No. 2016-146253.

* cited by examiner

*Primary Examiner* — Aaron W Carter
(74) *Attorney, Agent, or Firm* — Oblon, McClelland, Maier & Neustadt, L.L.P.

(57) ABSTRACT

An image processing method in accordance with this disclosure includes steps of obtaining an object image including an operating body, extracting the operating body from the object image, and calculating an orientation of the operating body in the object image. The method further includes determining whether the operating body is of an operator that operates an apparatus based on the orientation of the operation body.

12 Claims, 10 Drawing Sheets

IMAGE PROCESSING METHOD, DEVICE AND NON-TRANSITORY COMPUTER-READABLE MEDIUM

CROSS-REFERENCE TO RELATED APPLICATIONS

The present application is based on and claims the benefit of priority to Chinese Application No. 201510458583.7, filed on Jul. 30, 2015, the entire contents of which are incorporated by reference.

BACKGROUND

The present disclosure generally relates to image processing technology, and specifically, relates to image processing method and device for detecting the operator's operating body.

Description of the Related Art

Recently, with the increasing development of information technology, electronic devices are able to identify an operator's actions and implement corresponding processing. Typically, such electronic devices capture an object image (including video) by a camera, and then identify the operator's hand movement (gesture) in the object image, so as to perform various processing corresponding to the gesture.

However, there are situations when the acquired object image includes an operating body other than the operator's. In such cases, the electronic device needs to determine which operating body belongs to the operator, otherwise the electronic device is susceptible mis-operation due to registering gestures of an operating body other than the operator.

As an example, there are smart glasses which are able to identify an operator's gestures, as illustrated in a first view image in FIG. 1. As illustrated in FIG. 1, there are two hands in the image, in which hand 1 holding the mouse and closing to the electronic device is the operator's hand, while hand 2 belongs to someone else located opposite the operator's hand. In this case, the electronic device needs to distinguish which hand is the operator's hand. After detecting hand 1 as the operator's hand, the electronic device needs to recognize the movements of hand 1 while ignoring the movements of the non-operator's hand 2.

The traditional method for detecting an operating body of an operator operating an electronic device needs to use time, space and the probabilistic graphical models of appearance for modeling. However, such methods are disadvantageous due to the high operating expense, power and time consumption of the implementation of such complex calculations.

SUMMARY

The present disclosure provides an image processing method, device and non-transitory computer-readable recording medium, which can realize high efficiency and accuracy interact between the electronic device and user without interfered by non-operator's operating body.

In accordance with the present disclosure, an image processing method comprises obtaining an object image including an operating body and extracting the operating body from the object image. The method further comprises calculating, by a processing circuitry, an orientation of the operating body in the object image, and determining whether the operating body is of an operator that operates an apparatus based on the orientation of the operation body. The method may further comprise obtaining depth information of the operating body, wherein the determining includes determining that the operating body is operating the device when the orientation of the operation body meets a first condition and the depth information meets a second condition.

The image processing method may further comprise retrieving contour pixels of the operating body, computing a curvature density of a predetermined range around the contour pixels, clustering the curvature density into a first curvature density cluster with a first curvature density cluster center and a second curvature density cluster with a second curvature density cluster center, such that the curvature density of the first curvature density cluster is higher than the one of the second curvature density cluster, and determining, based on the first curvature density cluster center and the second curvature density cluster center, the orientation of the operating body. Calculating the orientation may include, after the computing and before the clustering, adjusting the curvature density. Adjusting the curvature density may include increasing the curvature density when the curvature density higher than a predetermined threshold, and decreasing the curvature density when the curvature density lower than the predetermined threshold.

The image processing method may further comprise, when the object image includes a plurality of operating bodies, extracting the plurality of operating bodies from the object image, calculating, by the processing circuitry, an orientation of each operating body of the plurality of operating bodies in the object image, and determining, by the processing circuitry, which operating body of the plurality of operating bodies is operating a device based on the orientation of each operating body of the plurality of operating bodies.

In accordance with the present disclosure, an image processing device comprises an obtaining device that obtains an object image including an operating body, and processing circuitry configured to extract the operating body from the object image and calculate the orientation of each operating body in the object image. The processing circuitry is further configured to determine whether the operating body is operating a device based on the orientation of the operation body.

The processing circuitry of the image processing device is further configured to, when the object image includes a plurality of operating bodies, extract the plurality of operating bodies from the object image, calculate an orientation of each operating body of the plurality of operating bodies in the object image, and determine which operating body of the plurality of operating bodies is operating an apparatus (in other words, determine which operating body is of the operator that operating an apparatus) based on the orientation of each operating body of the plurality of operating bodies.

When the object image includes a plurality of operating bodies, the processing circuitry of the image processing device is configured to determine which operating body of the plurality of operating bodies is of the operator based on an orientation of each operating body of the plurality of operating bodies.

In accordance with the present disclosure, an electronic system may comprise the image processing device and a camera that captures the object image, wherein the obtaining device obtains the object image from the camera. The camera may be physical connected to the image processing device. The obtaining device may obtain the object image from the camera via wireless communication. The camera may be remote from the image processing device.

In accordance with the present disclosure, a pair of smart glasses comprises shutter glasses that capture an object image, a sensor is connected to a frame of the smart glasses, and the image processing device, wherein the image processing device is connected to the frame of the smart glasses, and the obtaining device obtains the object image from the sensor in the smart glasses.

In accordance with the present disclosure, a non-transitory computer-readable medium includes computer executable instructions which, when executed by processing circuitry of a device operated by an operator, cause the processing circuitry to execute a process comprising obtaining an object image including an operating body, extracting the operating body from the object image, calculating an orientation of the operating body in the object image, and determining whether the operating body is of the operator based on the orientation of the operation body. The process may further comprise obtaining depth information of the operating body, and the determining includes determining that the operating body is operating the device when the orientation of the operation body meets a first condition and the depth information meets a second condition.

BRIEF DESCRIPTION OF THE DRAWINGS

The accompanying drawings are included to provide further understanding of the present application, and are incorporated in and constitute a part of this specification. The drawings, together with the specification, serve to explain the principle of the present application.

DETAILED DESCRIPTION

In the following, exemplary implementations are described in detail with reference to the accompanying drawings so as to facilitate the understanding of the disclosure. However, the disclosure of this patent specification is not intended to be limited to the specific terminology so selected, and it is to be understood that each specific element includes all technical equivalents that operate in a similar manner and achieve a similar result.

An image processing device according to the present disclosure is configured to determine an operator's body, provide a result to an electronic device, detect movement of the operator's body and then implement a process corresponding to the movement of the operator's body. The image processing device determines an operator's body by determining the operator's body from other objects in an object image, even if the object image includes parts (e.g. hands, limbs) of other people/non-operators.

In some implementations, the electronic device may be a pair of smart glasses. However, the electronic device need not be limited to smart glasses, as the electronic device might be another type of multi-function electronic device such as a tablet computer (PC), laptop PC, smart phone, multi-peripheral device (MFP), and so on. Besides, the electronic device might a wearable electronic device such as a pair of smart glasses, and the electronic device might be a split electronic equipment which connect to an image processing device to receive the operator's operating body information from the image processing device. The operating body might be any part of the operator's body. In the following, for convenience of explanation, a pair of smart glasses that detect the operator's hand in a first perspective image is illustrated as an example.

Figure 1:
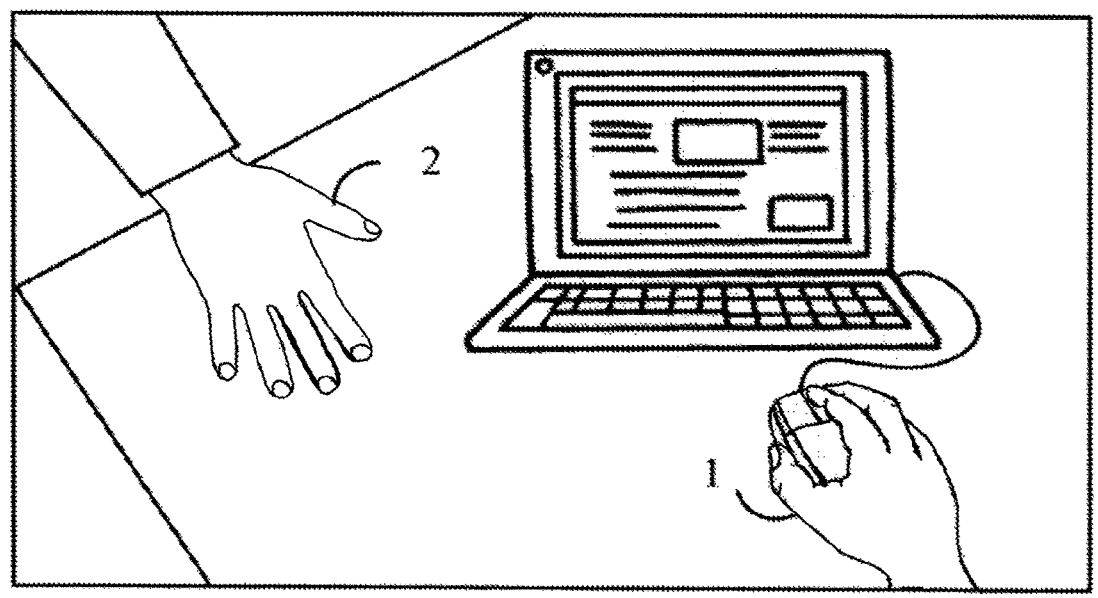
FIG. 1 illustrates a schematic drawing of an object image.
Figure 2:
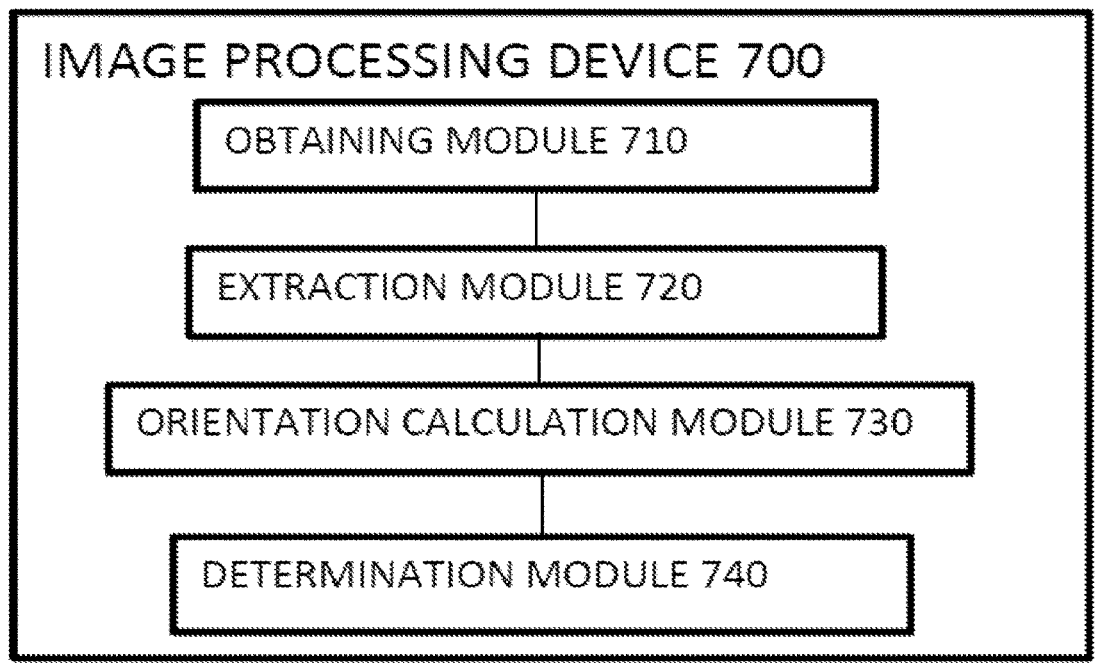
FIG. 2 illustrates an image processing device according to the present disclosure.

FIG. 2 illustrates an image processing device according to the present disclosure. As shown in FIG. 2, image processing device 700 may include obtaining module 710, extraction module 720, orientation calculation module 730, and determination module 740.

In an exemplary implementation, image processing device 700 is a general or specific-purpose processor, CPU, a digital signal processor (DSP), an ASIC, a field programmable gate array (FPGA) or other programmable logic device (PLD), a discrete gate or transistor logic, discrete hardware components or any other combination for executing functions to realize logic blocks. Image processing device 700 may include modules and/or circuits, all of which can be referred to as processing circuitry. The processing circuitry may include a general-purpose processor, and the processing circuitry may include any number of processors, controllers, micro-controllers or state machines. The processing circuitry can also be a combination of computer equipment, such as a combination of a DSP and a microprocessor, a combination of plural micro-processors, or a combination of a DSP and plural micro-processors.

The processing circuitry of image processing device 700 may separately or jointly implement each of obtaining module 710, extraction module 720, orientation calculation module 730 and determination module 740. Moreover, functionality of the processing circuitry of image processing device 700 may be stored in a non-transitory computer-readable medium as one or more commands executed by the processing circuitry. The recording medium can be any real medium that can be accessible by the processing circuitry. Such a non-transitory computer-readable medium may include a RAM, a ROM, an EEPROM, or other static/dynamic memory or media.

In an exemplary implementation, obtaining module 710 obtains an object image. In one example, the image processing device 700 is configured within a pair of smart glasses, and the obtaining module 710 obtains a first perspective 2D object image though a camera and/or other sensor set in the smart glasses. The object image may be a 2D or 3D image. The "object image" captured by obtaining module 710 includes at least one operating body. Furthermore, in some implementations, obtaining module 710 obtains the object image from a remote sensor, via wireless communication (e.g. Wifi, Bluetooth, cellular), and the remote sensor may capture the object image or may receive the object image from an external camera. The object image may be in a first perspective image or may be in a third perspective image.

Generally, the object image may include grey-scale information and depth information, in which the depth information includes information about a distance from a sensor to a subject. As an example, the depth information may be obtained thought parallax calculation based on images obtained by two cameras. Additionally, the depth information may be directly obtained by distance sensors such as infrared sensors or so. Furthermore, the object image may include color information.

Extraction module 720 extracts operating bodies from the object image. In some examples, the extraction module 720 detects whether the object image includes an operating body. Extraction module 720 may determine how many operating bodies are included in the object image. Further, extraction module 720 may determine where the operating body/bodies are located based on features of the hand and by using the depth information, grey scale information, color information or combination thereof. It should be noted that, when the operating body is a part other than a hand, such as foot, the functionality of extraction module 720 may be based on features of the part. When no operating body is detected, the processing circuitry of image processing device 700 will perform no further processing.

Orientation calculation module 730 calculates an orientation of the operating body in the object image. Here, the orientation may be calculated based on one or more features of the operating body. For example, when the operating body is a hand, the texture, shape, color characteristics of one or more fingers of the hand are quite different than features/characteristics of the palm part of the hand. As a result, the orientation of the hand may be detected. In order to calculate the orientation of each operating body with high efficiency and high accuracy, the present disclosure provides the following.

In exemplary implementations, an orientation of a hand in an object image is calculated based on a difference between a texture of one or more fingers and a texture of a palm. A curvature density is applied to express the texture of the one or more fingers. By using the curvature density instead of using a curvature of a pixel, any error caused by an occasion large curvature of a particular pixel on the palm or an occasional small curvature of a particular pixel on the finger may be reduced. Specifically, the one or more fingers may have a rich texture and relatively high curvature density, while the palm may have a flat and relatively low texture and relatively low curvature density. Therefore, the orientation of each operating body may be determined based on (1) the first curvature density cluster center—the finger curvature density cluster center, and (2) the second curvature density cluster center—the palm curvature density cluster center. Orientation calculation module 730 will now be further described with respect to FIG. 3.

Figure 3:
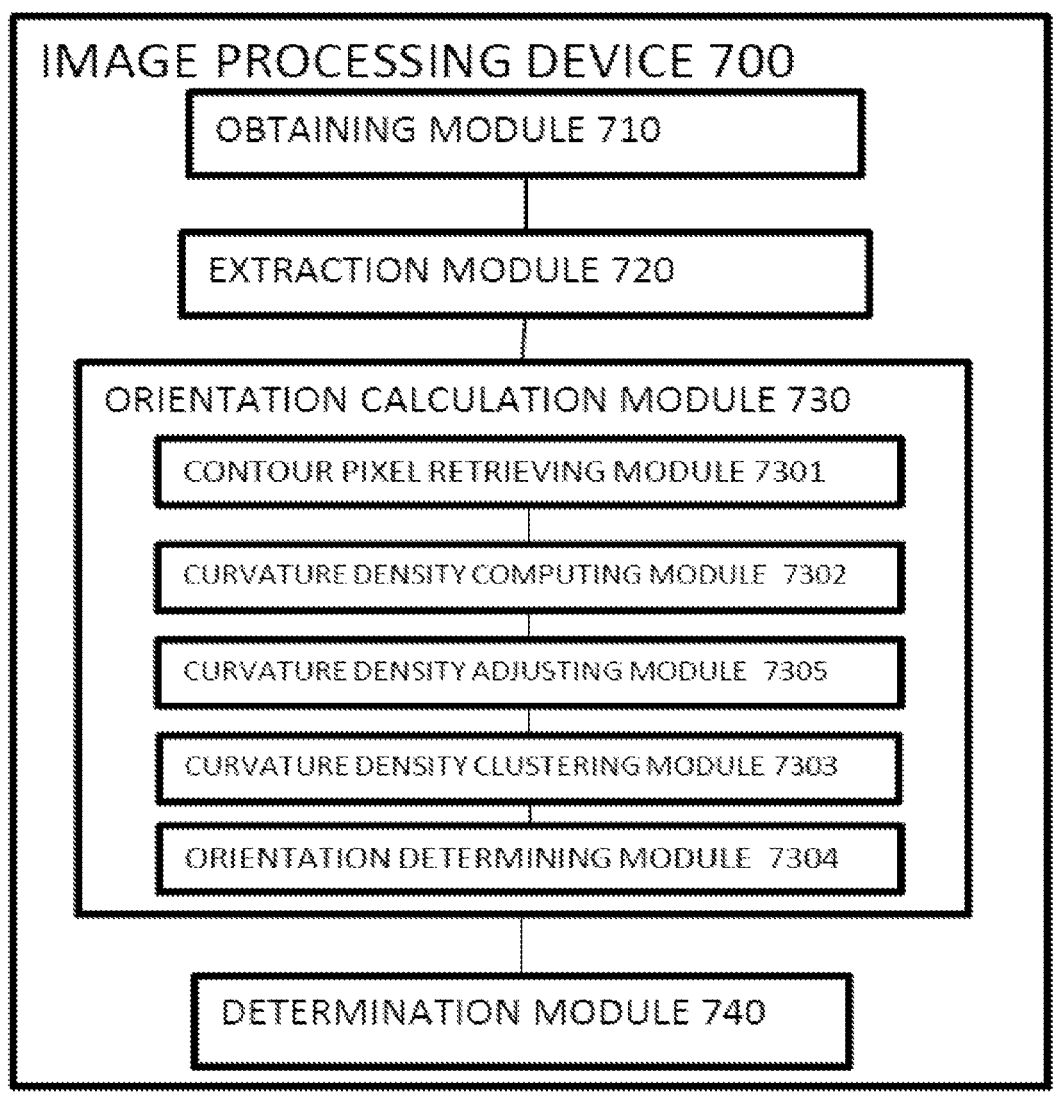
FIG. 3 illustrates an orientation calculation module according to the present disclosure.

FIG. 3 illustrates an orientation calculation module according to the present disclosure. In particular, in some implementations, orientation calculation module 730 may comprise contour pixel retrieving module 7301, curvature density computing module 7302, curvature density clustering module 7303, orientation determining module 7304 and curvature density adjusting module 7305.

Contour pixel retrieving module 7301 retrieves a contour pixel of each operating body. Specifically, as for each detected operating body, contour pixel retrieving module 7301 generates a gradient map based on the depth information of each operating body in the object image, and then the contour pixel retrieving module 7301 retrieves the contour pixel of each operating body from the gradient map. For example, the gradient map is generated based on a difference method, and the contour pixel is retrieved by utilizing canny operator, sobel operator, or a Laplace transform.

Curvature density computing module 7302 computes a curvature density of a predetermined range around the contour pixels. The predetermined range is a predefined pixels range with a predetermined height and a predetermined width. As an example, the predetermined range may be a 7×7 or 9×9 pixels with the contour pixel as a center. For each contour pixel, the curvature density of the predetermined range is computed according to the following formula (1):

$$V_p = \frac{1}{n} \sum_{i=1}^{H} \sum_{j=1}^{W} d_{ij}. \tag{1}$$

In formula (1), $V_p$ is a curvature density of pixel p, H is the height of the pixel range, W is the width of the pixel range, d is the curvature of a pixel, and n is the number of the non-zone pixels of the pixel range.

When a hand is open, the pixel ranges of the fingers and the palm are generally relatively large. A cluster of the finger curvature density (hereinafter, first curvature density) and the palm curvature density (hereinafter, second curvature density), as well as the generation of a first curvature density cluster center of the first curvature density, and a second curvature density cluster center of the second curvature density are calculated according to the above formula (1).

However, when a pixel range of the fingers and the palm is relatively narrow because the hand is closed (e.g. clinched) or due to an angle of the hand in the object image, the first curvature density cluster center is close to the second curvature density cluster center. In order to decrease an error of the orientation result, after the curvature density of the predetermined range around the contour pixel is computed, the curvature density of the contour pixel may be adjusted so as to increase a difference between the curvature density of the first curvature density cluster and the second curvature density cluster.

Specifically, orientation calculation module 730 may further comprise curvature density adjusting module 7305. After the curvature density computing module 7302 computes a curvature density of a predetermined range around the contour pixels and before the computation of a curvature density transfer to the curvature density clustering module 7303 to be clustered, the curvature density adjusting module 7305 adjusts the curvature density. Curvature density adjusting module 7305 adjusts the curvature density by increasing the curvature density when the curvature density higher than a predetermined threshold, and by decreasing the curvature density when the curvature density lower than a predetermined threshold.

In some examples, the curvature density adjusting module 7305 adjusts the curvature density according the following formula (2).

$$dp = \begin{cases} \max\{V_p \cap V_{N_p}\}, & \text{if } \frac{1}{N+1} \sum_{q \in p \cap N_p} V_q \geq \Delta \\ \min\{V_p \cap V_{N_p}\}, & \text{if } \frac{1}{N+1} \sum_{q \in p \cap N_p} V_q < \Delta \end{cases}. \tag{2}$$

In formula (2), the $d_p$ is the adjusted curvature density of contour pixel p. $N_p$ is pixels assemblage of the pixel p and non-zero pixels around the pixel p. As an example, the pixels assemblage $N_p$ may include pixel p and four pixels located to the top, bottom, right and left of the pixel p. As another example, the pixels assemblage $N_p$ may include pixel p, four pixels located to the top, bottom, right and left of the pixel p, and four pixels located at top-left, bottom-left, top-right, and bottom-right of the pixel p. It should be noted that the pixels assemblage should not be limited to the given example, it may also include other pixels around pixel p.

V is original curvature density (which means the curvature density received from curvature density computing module 7302), while $V_p$ is an original curvature density of pixel p. $V_{Np}$ is an assemblage of the curvature density of the pixels assemblage $N_p$. N is the number of non-zero pixels (a pixel with non-zero curvature) around pixel p. Δ is a predetermined threshold value, which can be set according to the environment or application field, and the predetermined threshold value may also be set according to a learning sample.

From formula (2), the adjusting performed by curvature density adjusting module 7305 may include iteratively implementing a process including: when an average curvature density of an assemblage of the contour pixel and non-zero pixels around the contour pixel is equal or higher than a predetermined threshold value Δ, selecting a highest curvature density in the assemblage and adjusting the curvature density of the contour pixel to the highest curvature density. When an average curvature density of an assemblage of the contour pixel and non-zero pixels around the contour pixel is lower than a predetermined threshold value Δ, selecting a lowest curvature density in the assemblage and adjusting the curvature density of the contour pixel to the lowest curvature density.

Subsequently, curvature density clustering module 7303 clusters the curvature density (in some examples, adjusted curvature density) into a first curvature density cluster with a first curvature density cluster center and a second curvature density cluster with a second curvature density cluster center, while the curvature density of the first curvature density cluster is higher than the one of the second curvature density cluster. In the case the operating body is a hand, the first curvature density cluster center might be a high curvature density cluster center of the finger part, while the second curvature density cluster center might be a low curvature density cluster center of the palm part.

Here, curvature density clustering module 7303 uses a k-means clustering method to cluster the curvature density and to obtain the first curvature density cluster center and the second curvature density cluster center by designating the number of the clusters k=2. In the case the first curvature density cluster center is close to the second curvature density cluster center, an error of orientation of the operating body obtained by the curvature density clustering module 7303 based on the first curvature density cluster center and the second curvature density cluster center might increase. Therefore, curvature density clustering module 730 utilizes formula (3) to generate the first curvature density cluster center and the second curvature density cluster center with lowest J (μ) respectively, in which J (μ) represents a function of the sum of the squares of the distances from each sample point to its cluster center:

$$J(\mu) = \sum_{i=1}^{2} \sum_{j=1}^{N_j} \frac{(X_i^{(j)} - \mu_i)^2}{\alpha D}. \quad (3)$$

In formula (3), the $\mu_1$ is the first curvature density cluster center, $\mu_2$ is the second curvature density cluster center, D is a distance between the first curvature density cluster center and the second curvature density cluster center, α is a weight of the distance, $N_i$ is number of the pixels of i curvature density cluster, $X_i^{(j)}$ is j pixel of i curvature density cluster and X=(v, βx, γd), while v is curvature density, x is location, d is depth, β is a weight coefficient of the location, and γ is a weight coefficient of the depth.

Considering that the contour pixels of the finger part and the contour pixels of the palm might have similar curvature density, localization, and depth, in formula (3), X has three parameters which include curvature density v, location x, and depth d. Additionally, according to the present example, in formula (3), a distance D between the first curvature density cluster center and the second curvature density cluster center with a weight α is introduced as a denominator, so as to increase the accuracy the final orientation result by generating the first curvature density cluster center and a second curvature density cluster center located as far as possible from the first curvature density cluster center.

Subsequently, orientation determining module 7304 determines the orientation of the operating body based on the first curvature density cluster center and the second curvature density cluster center.

Figure 4:
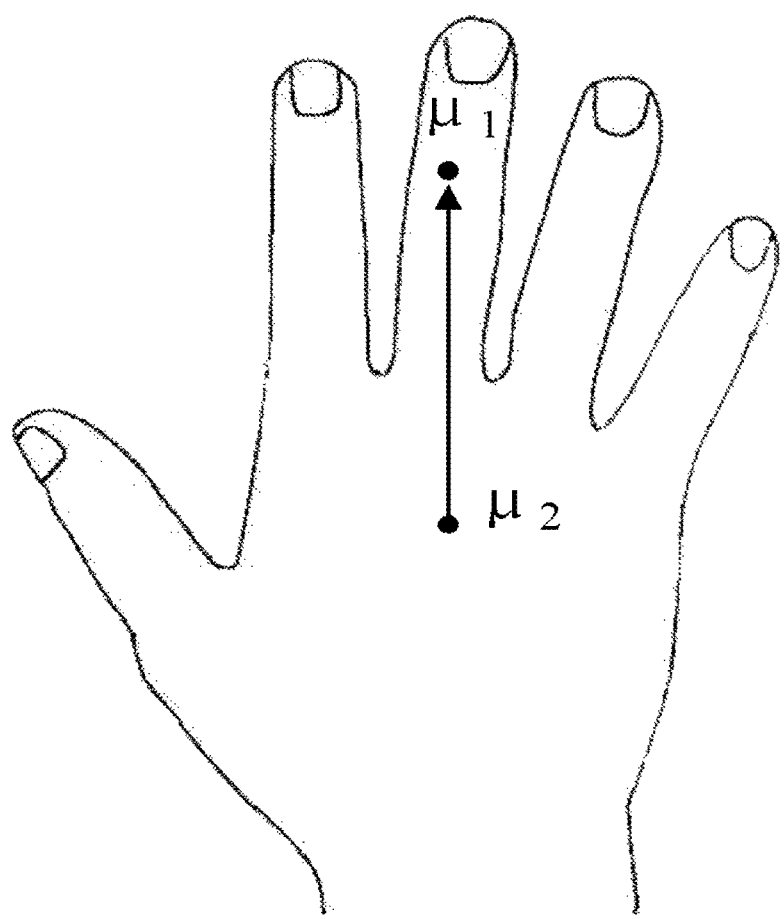
FIG. 4 illustrates an orientation of an operating body determined based on the first curvature density cluster center and the second curvature density cluster center according to the present disclosure.

FIG. 4 illustrates an orientation of an operating body determined based on the first curvature density cluster center and the second curvature density cluster center according to the present disclosure. As illustrated in FIG. 4, after the orientation determining module 7304 generates a first curvature density cluster center $\mu_1$ of the first curvature density cluster, and a second curvature density cluster center $\mu_2$ of the second curvature density cluster, orientation determining module 7304 determines vector $<\mu_2, \mu_1>$ that is the orientation of the hand. According to the above process, the orientation determining module 7304 calculates the orientation of the operating body in the object image.

Figure 5:
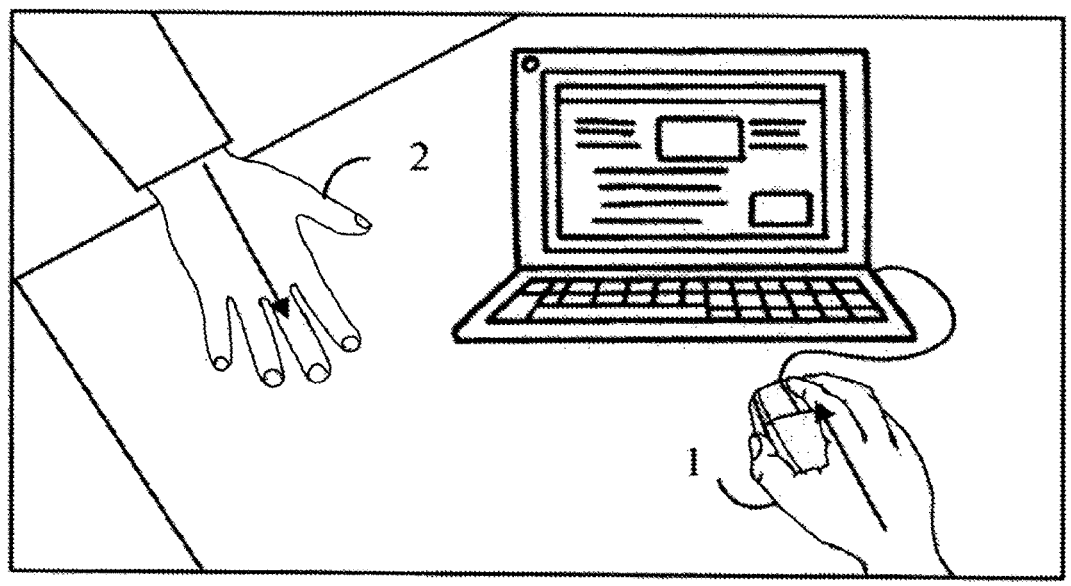
FIG. 5 illustrates a determined orientation of each operating body according to the present disclosure.

FIG. 5 illustrates a determined orientation of each operating body according to the present disclosure. In particular, FIG. 5, illustrates orientations of hand 1 and hand 2 as calculated by orientation calculation module 730.

After orientation calculation module 730 calculated the orientation of the operating body in the object image, determination module 740 determines an operating body belonging to an operator that is operating an apparatus (in the case the image processing device is an internal device of an electronic device—such as smart glasses, the apparatus means the smart glasses) when the orientation of the operation body meet the first condition. The first condition can be set according to the application environment. As an example, a hand (operating body) with an orientation within a specified direction range may be determined as the operator's operating body.

Figure 6:
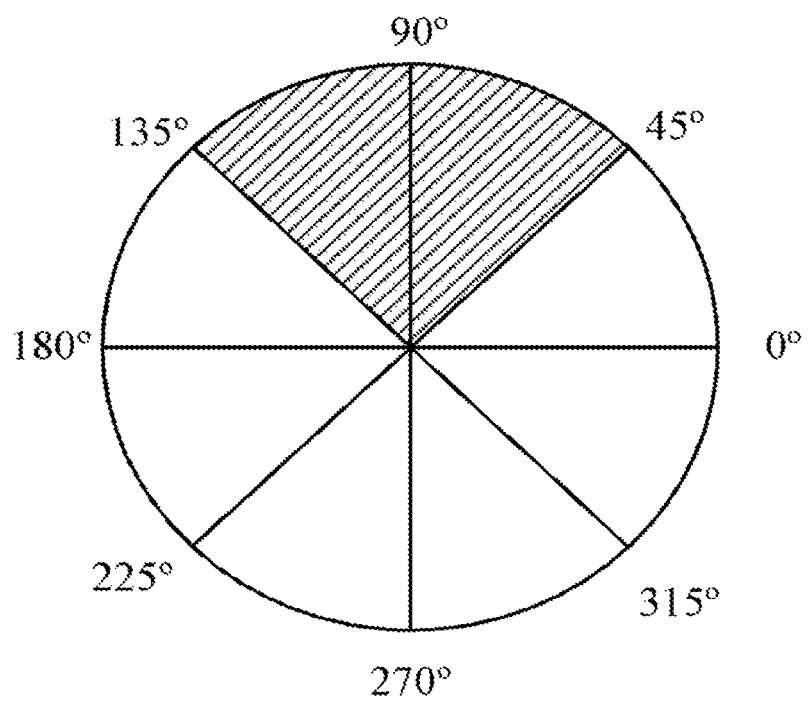
FIG. 6 illustrates determining an operating body of an operator operating a device based on the orientation of each operation body according to the present disclosure.

FIG. 6 illustrates determining an operating body of an operator operating a device based on the orientation of each operation body according to the present disclosure. As illustrated in FIG. 6, when the image processing device 700 is applied in smart glasses and the obtaining module 710 obtains a first perspective 2D object image though a camera and/or other sensor set in the smart glasses, a specified direction range may be configured to include a range from 45° to 135°.

Therefore, when the determination module 740 performs processing to determine an operator's operating body based on the orientation result shown in FIG. 5, performs the processing such that hand 1 is within the specified direction range and is determined to be the operator's operating body, while hand 2 is out of the specified direction range and is determined to be a hand belong to others. Therefore, based on a respond of the processing of determination module 740, the smart glasses may only detect the movement and/or gesture of hand 1 and implement a process corresponding to the detected movement and/or gesture of hand 1.

It should be noted that, in the above discussion, an example embodiment of setting the first condition for when the obtaining module 710 obtains a first perspective 2D object image, one of skill in the art may set the first condition according to an application environment. For example, when the obtaining module 710 obtains the object image from a remote sensor which can receive the object image took by and submitted from an external camera and the object image is a third perspective image, the first condition may be set according to a localization of the external camera. Additionally, the first condition might not be limited to a specific direction range, such that the image processing device 700 may learn through a simulation that the orientation of the operating body belongs to an operator or belongs to others, and then the determination module 740 determines that an operating body belonging to an operator is operating a device based on a learning result. According to another exemplary implementation, the image processing device 700 may detect the operator's operating body based on orientation information and depth information of each operating body. For example, the obtaining module 710 obtains depth information of the operating body as well as depth information for the object image. The depth information of the operating body might be obtained from depth information of other parts of the object image.

After obtaining depth information of each operating body, determination module 740 determines whether an operating body is the operating body of an operator that is operating a device according to whether the orientation of the operation body meets a first condition and the depth information meets a second condition.

If the object image is a first perspective image, and the operator's operating body is close to an electronic device which may be operated according to the operator's operating, then after the determination module 740 determines that the orientation of the operation body meets the first condition, the determination module 740 determines whether the operating body is close to the electronic device by determining that the depth information of the operating body meets the second condition.

The second condition may be a predetermined distance between the operating body and the electronic device. Of course, instead of the predetermined distance, the determination module 740 may generate an experience distance trained by a simulator, and the determination module 740 may determine whether the operating body is close to the electronic device by determining that the depth information of the operating body meets the second condition—the experience distance. Additionally, when the object image is a third perspective image, the second condition may be set according to the localization of the camera which takes the object image.

According to the above process, a high efficiency and accuracy interact between the electronic device and user without interfered by non-operator's operating body can be realized.

Figure 7:
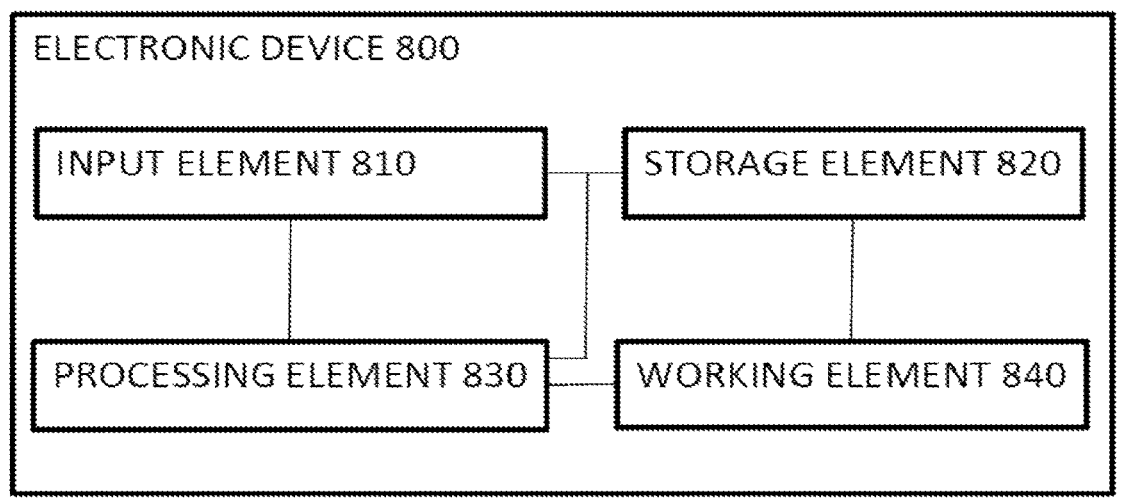
FIG. 7 illustrates an image processing device of the present disclosure.

Discussion will now turn to an electronic device in accordance with the present disclosure. FIG. 7 illustrates an image processing device of the present disclosure. In particular, FIG. 7 illustrates electronic device 800 (for example, an smart glasses) that is able to identify the operator's actions and implement corresponding processing. As illustrated in FIG. 7, the device 800 includes an image obtaining element 810, a storage element 820, a processing element 830, and a working element 840.

In an exemplary implementation, electronic device 800 is a general or specific-purpose processor, CPU, a digital signal processor (DSP), an ASIC, a field programmable gate array (FPGA) or other programmable logic device (PLD), a discrete gate or transistor logic, discrete hardware components or any other combination for executing functions to realize logic blocks. Image processing device 700 may include modules, elements and/or circuits, all of which can be referred to as processing circuitry. The processing circuitry may include a general-purpose processor, and the processing circuitry may include any number of processors, controllers, micro-controllers or state machines. The processing circuitry can also be a combination of computer equipment, such as a combination of a DSP and a micro-processor, a combination of plural micro-processors, or a combination of a DSP and plural micro-processors.

In an exemplary implementation, image obtaining element 810 may include a camera and/or sensor for obtaining object images.

The storage element 820 may store computer executable instructions by a volatile method or a nonvolatile method, such as various kinds of volatile or nonvolatile memory including a random-access memory (RAM), a read-only memory (ROM), a hard disk and a semiconductor memory, in which, when the instructions are executed by a processing element 830, the processing element 830 is caused to execute a process for detecting the operator's operating body.

In particular, the processing circuitry of electronic device 800 may separately or jointly implement each of image obtaining element 810, storage element 820, processing element 830 and working element 840. Moreover, functionality of the processing circuitry of electronic device 800 may be stored in a non-transitory computer-readable medium as one or more commands executed by the processing circuitry, which may be (or be separate from) storage element 820. The recording medium can be any real medium that can be accessible by the processing circuitry. Such a non-transitory computer-readable medium may include a RAM, a ROM, an EEPROM, or other static/dynamic memory or media.

The processing circuitry of electronic device 800 is configured such that processing element 830 implements the above method for detecting the operator's operating body. Further, electronic device 800 may be connected to a network such as the Internet (not shown) to transmit the processed results to a remote apparatus based on demands of the processing.

The processing circuitry of electronic device 800 is configured such that working element 840 implements corresponding processing according to a result obtained by processing element 830 though implementing the above process of detecting the operator's operating body. For example, the result of the processing element 830 may be to switch from one processing to another processing, such as changing an entertainment program offered by the smart glasses.

Discussion will now turn to an image processing method in accordance with the present disclosure.

The image processing method according to the present disclosure may be applied in an electronic device, such that the electronic device detects the movement of the operator's operating body and implement a corresponding process.

Figure 8:
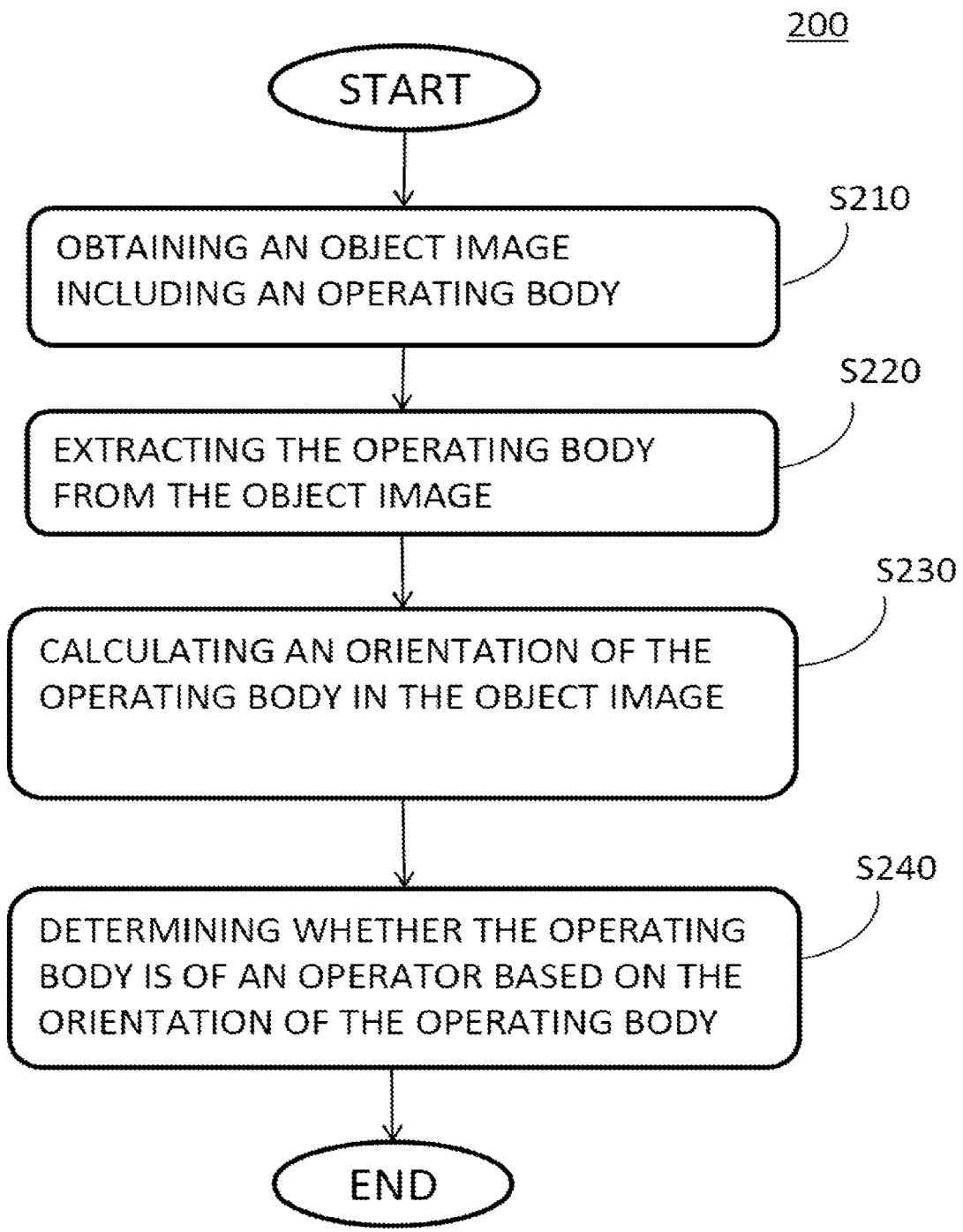
FIG. 8 illustrates a flowchart of an image processing method according to the present disclosure.

FIG. 8 illustrates a flowchart of an image processing method according to the present disclosure. One or more of the steps of image processing method 200 may be performed by the processing circuitry of image processing device 700. As shown in FIG. 8, image processing method 200 begins at step S210.

In step S210, an object image is obtained. In detail, the obtaining module 710 obtains the object image. In one example, the image processing method might be applied in smart glasses, and a first perspective 2D object image may be obtained through a camera and/or other sensor set in the smart glasses. Furthermore, obtaining module 710 might also obtain the object image from a remote sensor which can receive the object image took by and submitted from an external camera.

Next, in step S220, the operating body is extracted from the object image. For example, whether the object image includes operating body, and/or how many operating bodies included in the object image, and/or where the operating body/bodies located may be detected via extraction module 720, based on the hand's feature by using the depth information, grey scale information, color information or combination thereof.

In step S230, the orientation of the operating body in the object image is calculated. For example, the orientation of the operating body in the object image is calculated via the orientation calculation module 730. Here, the orientation is calculated based on the feature of the operating body. For example, when the operating body is a hand, the texture, shape, color characteristics of one or more fingers is quite different with the texture of a palm. Thus, the orientation of a hand in an object image is calculated based on the difference between a texture of the one or more fingers and the palm, while a curvature density is applied to express the rich texture.

Figure 9:
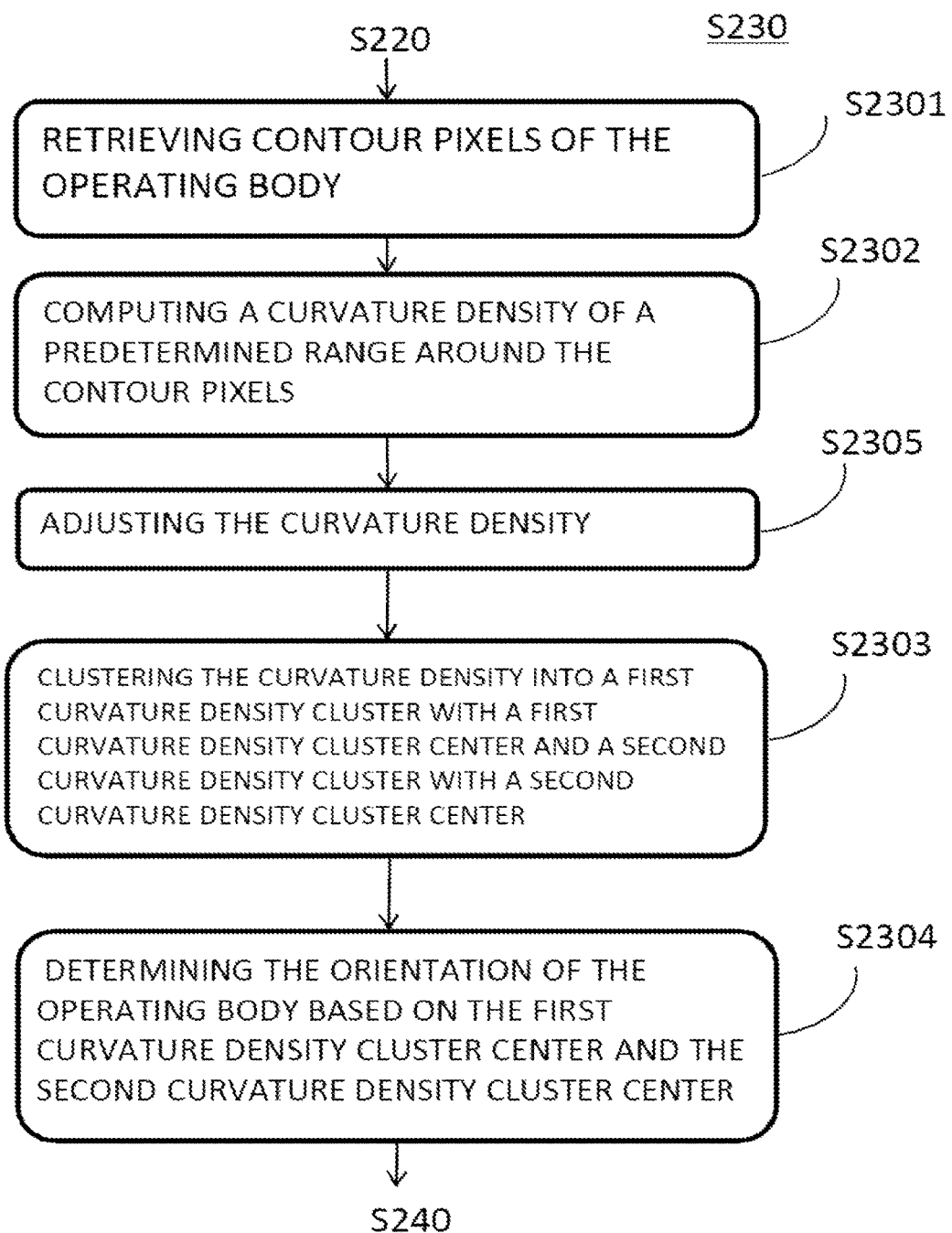
FIG. 9 illustrates a flowchart of the calculating of each operating body's orientation in the object image according to the present disclosure.

FIG. 9 illustrates a flowchart of the calculating of each operating body's orientation in the object image according to step S230 of the present disclosure. Step S230, and the steps illustrated in FIG. 9, are performed by the processing circuitry of image processing device 700. In step S2301, contour pixels of the operating body are retrieved. The contour pixels of each operating body may be retrieved via contour pixel retrieving module 7301. Specifically, as for each detected operating body, a gradient map may be generated based on the depth information of each operating body in the object image, then the contour pixels of each operating body may be retrieved from the gradient map. For example, the gradient map may be generated based on a difference method, and the contour pixel might be retrieved by utilizing canny operator, sobel operator, or a Laplace transform.

In step S2302, a curvature density of a predetermined range around the contour pixels may be computed via curvature density computing module 7302. The predetermined range may be a predefined pixels range with predetermined height and predetermined width. For each contour pixel, the curvature density of the predetermined range might be computed according to formula (1):

$$V_p = \frac{1}{n} \sum_{i=1}^{H} \sum_{j=1}^{W} d_{ij}, \quad (1)$$

as previously defined.

In some example, specifically, after step S2302 and before step S2303, the step S230 may include step S2305, adjusting the curvature density of the contour pixels by increasing the curvature density when the curvature density higher than a predetermined threshold, as well as decreasing the curvature density when the curvature density lower than a predetermined threshold.

In some examples, in step S2305, the curvature density may be adjusted via curvature density adjusting module 7305 according formula (2):

$$dp = \begin{cases} \max\{V_p \cap V_{N_p}\}, & \text{if } \frac{1}{N+1} \sum_{q \in p \cap N_p} V_q \geq \Delta \\ \min\{V_p \cap V_{N_p}\}, & \text{if } \frac{1}{N+1} \sum_{q \in p \cap N_p} V_q < \Delta \end{cases}, \quad (2)$$

as previously defined.

Subsequently, in step S2303, the curvature density (in some example, adjusted curvature density) may be clustered into a first curvature density cluster with a first curvature density cluster center and a second curvature density cluster with a second curvature via density cluster center curvature density clustering module 7303, such that the curvature density of the first curvature density cluster is higher than the one of the second curvature density cluster. In step S2303, formula (3) is utilized to generate the first curvature density cluster center and the second curvature density cluster center with lowest J (μ) respectively, $$J(\mu) = \sum_{i=1}^{2} \sum_{j=1}^{N_j} \frac{\left(X_i^{(j)} - \mu_i\right)^2}{\alpha D}, \quad (3)$$

as previously defined.

In step S2304, the orientation of the operating body is determined via orientation determining module 7304 based on the first curvature density cluster center and the second curvature density cluster center.

Returning to FIG. 8, after the orientation of each operating body in the object image are calculated in step S230, the method proceeds to step S240. In step S240, an operating body of an operator that is operating the device is determining via determination module 740 when the orientation of the operation body meets the first condition.

The first condition may be set according to the application environment. As an example, a hand (operating body) with an orientation within a specified direction range may be discriminated as the operator's operating body.

Figure 10:
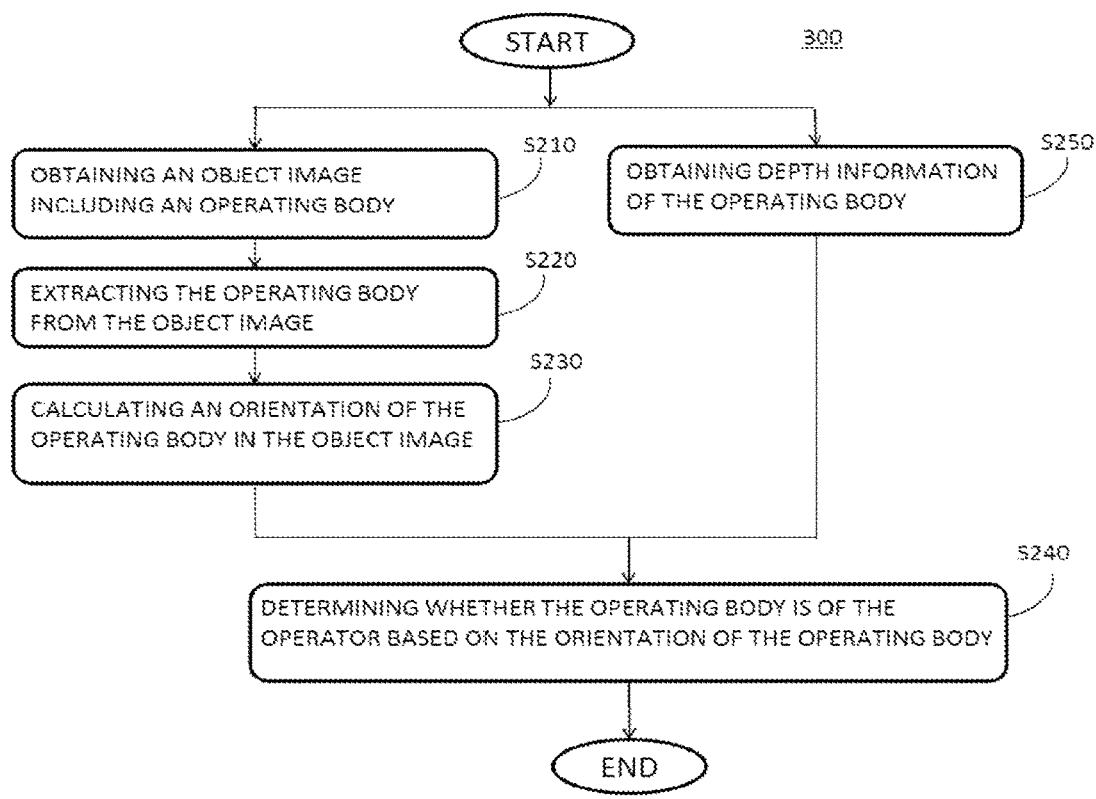
FIG. 10 illustrates a flowchart of an image processing method according to an exemplary embodiment of the present disclosure.

FIG. 10 illustrates a flowchart of an image processing method 300 according to another embodiment of the present disclosure. In particular, FIG. 10 illustrates a image processing method 300 that further comprises step S250: obtaining depth information of the operating body. Further, in step S240, the operating body of the operator that is operating the device is determining if the orientation of the operation body meets the first condition and the depth information (obtaining in step S250) meets a second condition. One or more of the steps illustrated in FIG. 10 may be performed by the processing circuitry of image processing device 700. In method 300, if the object image is a first perspective image, and the operator's operating body is close to an electronic device which might be operated according to the operator's operating of the device. In step S240, after the determination module 740 determines that the orientation of the operation body meets a first condition, the determination module 740 determines whether the operating body is close to the electronic device by determining that the depth information of the operating body meet a second condition. As previously discussed, the second condition may be a predetermined distance between the operating body and the electronic device or an experience distance might be trained by a simulator.

Moreover, the method steps of image processing method 300 need not be executed in the order illustrated in FIG. 10. For example, step S250 may be executed prior to, after or simultaneously with the execution of step S210. Step S250 may also be executed at any time prior to the execution of step S240. For example, step S250 may be executed first, then steps S210-S230 may be executed, followed by the execution of step S240.

It should be noted that advantages or effects described above are just examples, and the embodiments are not limited to those advantages or effects. The above descriptions of the embodiments are just examples, and various modifications, replacements, or combinations can be made without departing from the scope of the present disclosure by persons skilled in the art.

Further, the block diagrams of the units, apparatuses, devices and system are just examples, and the connection, placement and configuration illustrated in the block diagrams related to the present disclosure are not limited to these examples, and the units, apparatuses, devices and system may be connected, placed, or configured in any way. The terms "comprise", "include" and "have" are open-form terms, which mean and may be changed into "include and is not limited to." The terms "or" and "and" mean and may be changed into "and/or," unless the context dictates otherwise. The term "such as" means and may be changed to "such as, but not limited to."

The flowcharts and the methods according to the present disclosure are just examples, and are not limited to the steps in the disclosed embodiments. The steps of the disclosed embodiments can be performed in any order. The terms "next", "subsequently" and "then" are just for describing the present disclosure, and the present disclosure is not limited to these terms. Furthermore, the articles "a", "an," and "the" should not be limited to be singular elements.

It should be noted that, in the apparatus and method of the embodiments, each unit or each step may be divided and/or recombined. The division and/or recombination are equivalents of the embodiments.

The above operations may be provided in or performed by a computer program product. For example, such a computer program product may be a tangible medium where computer-readable commands are stored (or coded), and the commands can be executed by one or more processors to perform the operation. The computer program product may include packaging material.

The methods or apparatuses of the present application are described above. However, the above descriptions of the embodiments are just examples, and various modifications, replacements, or combinations can be made without departing from the scope of the present disclosure by persons skilled in the art.

What is claimed is:

1. An image processing method, comprising:
   obtaining an object image including an operating body;
   extracting the operating body from the object image;
   calculating, by processing circuitry, an orientation of the operating body in the object image; and
   determining, by the processing circuitry, whether the operating body is of an operator that operates an apparatus based on the orientation of the operation body, wherein
   the calculating the orientation includes:
      retrieving contour pixels of the operating body;
      computing a curvature density of a predetermined range around the contour pixels;
      clustering the curvature density into a first curvature density cluster with a first curvature density cluster center and a second curvature density cluster with a second curvature density cluster center, such that the curvature density of the first curvature density cluster is higher than the one of the second curvature density cluster; and
      determining, based on the first curvature density cluster center and the second curvature density cluster center, the orientation of the operating body.

2. The image processing method according to claim 1, further comprising:
   obtaining depth information of the operating body, wherein
   the determining includes determining that the operating body is of the operator when the orientation of the operation body meets a first condition and the depth information meets a second condition.

3. The image processing method according to claim 1, wherein
   the calculating the orientation further includes, after the computing and before the clustering, adjusting the curvature density, and
   the adjusting the curvature density includes:
      increasing the curvature density when the curvature density higher than a predetermined threshold; and
      decreasing the curvature density when the curvature density lower than the predetermined threshold.

4. The image processing method according to claim 3, wherein
   the predetermined threshold is a predetermined threshold value,
   increasing the curvature density includes selecting a highest curvature density in an assemblage and adjusting the curvature density of the contour pixel to the highest curvature density when an average curvature density of the assemblage of the contour pixel and non-zero pixels around the contour pixel is equal or higher than the predetermined threshold value, and
   decreasing the curvature density includes selecting a lowest curvature density in an assemblage and adjusting the curvature density of the contour pixel to the lowest curvature density when an average curvature density of the assemblage of the contour pixel and non-zero pixels around the contour pixel is lower than the predetermined threshold value.

5. The image processing method according to claim 1, wherein when the object image includes a plurality of operating bodies, the method further comprises:

extracting the plurality of operating bodies from the object image;

calculating, by the processing circuitry, an orientation of each operating body of the plurality of operating bodies in the object image; and determining, by the processing circuitry, which operating body of the plurality of operating bodies is of the operator based on the orientation of each operating body of the plurality of operating bodies.

6. An image processing device, comprising:

an obtaining device that obtains an object image including an operating body; and processing circuitry configured to
  extract the operating body from the object image;
  calculate the orientation of each operating body in the object image; and
  determine whether the operating body is of an operator that operates an apparatus based on the orientation of the operation body, wherein
to calculate the orientation of the operating body, the processing circuitry is configured to:
  retrieve contour pixels of the operating body;
  compute a curvature density of a predetermined range around the contour pixels;
  cluster the curvature density into a first curvature density cluster with a first curvature density cluster center and a second curvature density cluster with a second curvature density cluster center such that the curvature density of the first curvature density cluster is higher than the one of the second curvature density cluster; and
  determine, based on the first curvature density cluster center and the second curvature density cluster center, the orientation of the operating body.

7. The image processing device according to claim 6, wherein the processing circuitry is further configured to:
  obtain depth information of the operating body,
  determine that the operating body is operating the apparatus when the orientation of the operation body meets a first condition and the depth information meets a second condition.

8. The image processing device according to claim 6, wherein
  to calculate the orientation, the processing circuitry is configured to adjust the curvature density after computing the curvature density and before the clustering, and
  to adjust the curvature density, the processing circuitry is configured to:
    adjust the curvature density of the contour pixels by increasing the curvature density when the curvature density is equal to or higher than a predetermined threshold; and
    decrease the curvature density when the curvature density is lower than the predetermined threshold.

9. The image processing device according to claim 8, wherein
  the predetermined threshold is a predetermined threshold value,
  to increase the curvature density, the processing circuitry is configured to select a highest curvature density in an assemblage and adjusting the curvature density of the contour pixel to the highest curvature density when an average curvature density of the assemblage of the contour pixel and non-zero pixels around the contour pixel is equal or higher than the predetermined threshold value, and
  to decrease the curvature density, the processing circuitry is configured to select a lowest curvature density in an assemblage and adjusting the curvature density of the contour pixel to the lowest curvature density when an average curvature density of the assemblage of the contour pixel and non-zero pixels around the contour pixel is lower than the predetermined threshold value.

10. The image processing device according to claim 6, wherein
  the processing circuitry is configured to, when the object image includes a plurality of operating bodies:
    extract the plurality of operating bodies from the object image;
    calculate an orientation of each operating body of the plurality of operating bodies in the object image; and
    determine which operating body of the plurality of operating bodies is of the operator based on the orientation of each operating body of the plurality of operating bodies.

11. The image processing device according to claim 6, wherein when the object image includes a plurality of operating bodies, the processing circuitry is configured to determine which operating body of the plurality of operating bodies is of the operator based on an orientation of each operating body of the plurality of operating bodies.

12. A non-transitory computer-readable medium including computer executable instructions which, when executed by processing circuitry, cause the processing circuitry to execute a process comprising:
  obtaining an object image including an operating body;
  extracting the operating body from the object image;
  calculating an orientation of the operating body in the object image; and
  determining whether the operating body is of an operator that operates an apparatus based on the orientation of the operation body, wherein
  the calculating the orientation includes:
    retrieving contour pixels of the operating body;
    computing a curvature density of a predetermined range around the contour pixels;
    clustering the curvature density into a first curvature density cluster with a first curvature density cluster center and a second curvature density cluster with a second curvature density cluster center, such that the curvature density of the first curvature density cluster is higher than the one of the second curvature density cluster; and
    determining, based on the first curvature density cluster center and the second curvature density cluster center, the orientation of the operating body.

* * * * *